J. H. TRAVIS.

EXTENSION FOOT-REST FOR CHAIRS.

No. 6,868. Reissued Jan. 18, 1876.

Attest:

H. L. Perrine

W. L. Boyle

Inventor.

Joseph H. Travis

By James L. Norris.

Atty.

UNITED STATES PATENT OFFICE.

JOSEPH H. TRAVIS, OF BOSTON, MASSACHUSETTS.

IMPROVEMENT IN EXTENSION FOOT-RESTS FOR CHAIRS.

Specification forming part of Letters Patent No. 132,503, dated October 22, 1872; reissue No. 5,690, dated December 16, 1873; reissue No. 6,868, dated January 18, 1876; application filed January 14, 1876.

*To all whom it may concern:*

Be it known that I, JOSEPH H. TRAVIS, of Boston, in the county of Suffolk and State of Massachusetts, have invented certain Improvements in Extension Foot-Rests for Chairs, of which the following is a specification:

This invention relates to chairs having a foot or leg rest, and particularly to that class of chairs in which the foot or leg rest is carried by a frame arranged upon the chair to be inclosed within its legs or supporting portion, and to be drawn out therefrom into position for use.

A chair of this class is shown and described in the schedule annexed to the Letters Patent issued to me, dated June 6, 1871, No. 115,787.

This invention particularly relates to the arrangement of the foot or leg rest proper on its carrying-frame of the chair; and, as to this, it consists in substance of a combination and arrangement of the foot or leg rest on its carrying-frame for it to be moved on its frame, and in such a manner that it can be laid away or folded, as it were, within, and also opened out or unfolded, as it were, from its carrying-frame, so that in the first instance it, with its carrying-frame, can be most compactly disposed under the chair-seat; and, in the second instance, it can be brought to the most favorable position for a support to the legs of the occupant of the chair, and in such position be rigidly and firmly supported against the weight then upon it from movement in any direction, and, to all intents and purposes for such a support, be as firm and rigid as if it were rigidly attached to its carrying-frame and were not adapted for being folded and unfolded thereon.

Figure 1:
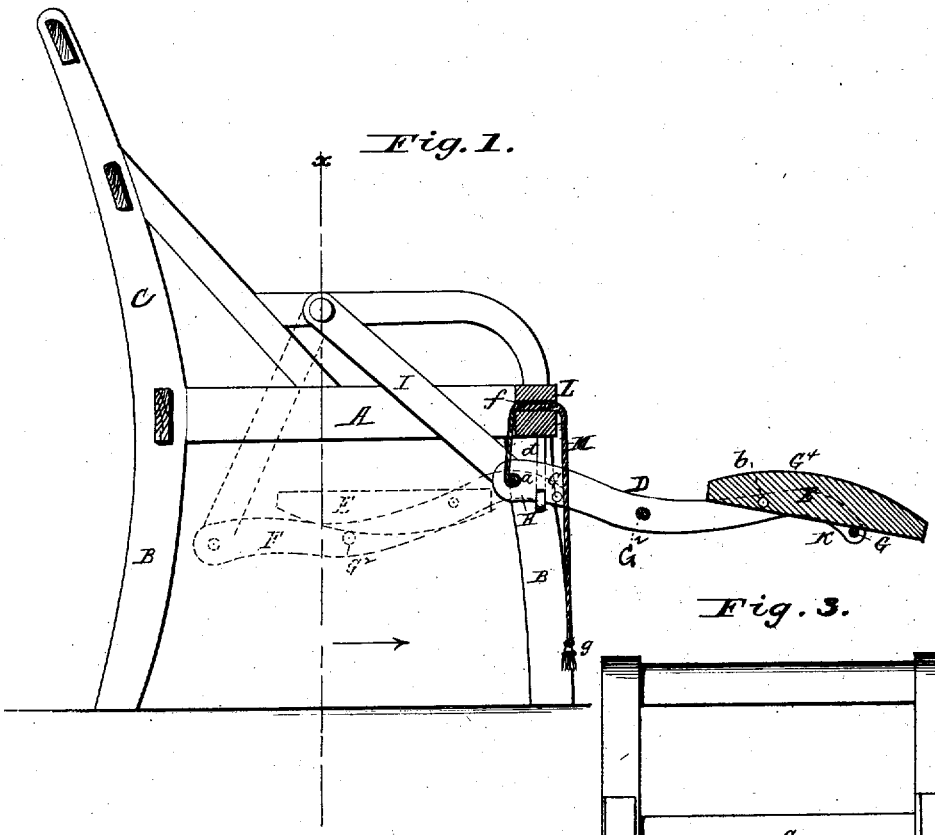
Figure 3:
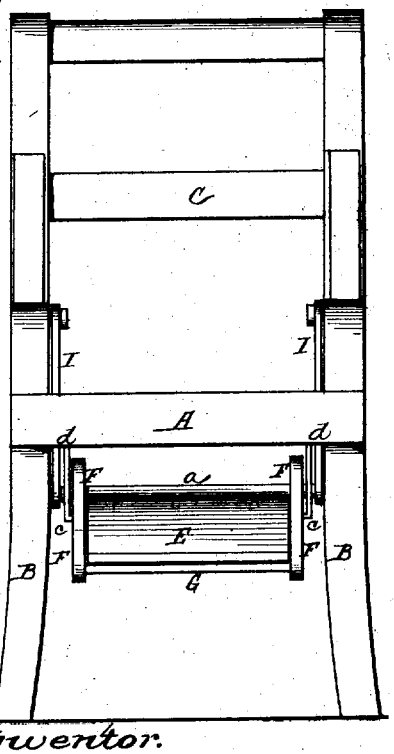
Figure 2:
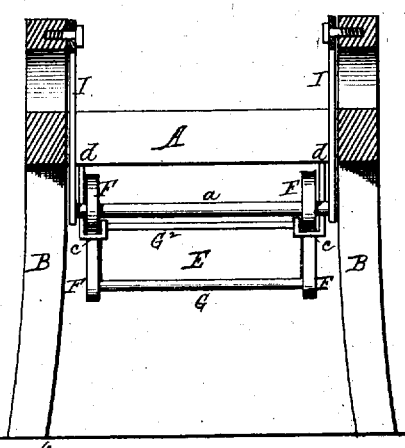

In the accompanying plate of drawings my invention is illustrated, Figure 1 being a central vertical section from front to back of chair, showing the foot-rest as distended, and in dotted lines as under and inclosed within the chair-frame; Fig. 2, a transverse vertical section in plane of line *x x*, Fig. 1; Fig. 3, a front view.

A in the drawing represents the base of the chair-seat; B, the supporting-legs; and C, the back-frame, constructed in themselves with the seat and back frames upholstered in any of the usual modes and styles; D, a frame, which, under the present invention, carries the foot and leg rest E in the chair.

The frame D is constructed of side rails F, joined together between its two ends by cross-rounds G $G^2$. By the end H the frame D is hung upon the cross-rod *a*, which is carried by the lower ends of two similar downward-projecting levers or arms, I, hung at their upper ends to the chair-frame A, one upon each side of the same. At the end K of the frame D is arranged the foot and leg rest E. The rest E is located between the two side rails F of the frame D, and near one end, as shown at *b*, Fig. 1. It is attached to each rail F, so that it can be revolved or turned over to bring its inclined or cushioned surface $G^4$ uppermost, as shown in Fig. 1, or lowermost, as shown by dotted lines in the same figure. This is accomplished by pivoting the rest between the rails in the rest-frame. The location of the pivoted point is shown in the drawing at *b*. It is placed upon one side of the longitudinal center of the rest, the latter being supported when in position for use by a brace, G, at the extremity of the rest-frame. Its upholstered surface is then uppermost and lies nearly in the plane of the chair-seat, of which it forms, as it were, a continuation, thereby supporting the limbs in a natural and easy position. When not in use, the rest E is turned upon the pivot *b*, until the upper surface rests upon the brace $G^2$, which connects the side rails of the rest-frame. The frame D is supported at the front of the chair upon the horizontal arms *c* of staple pins *d* fixed in the front rail L of the chair-frame, and on these arms the frame D rests when it is drawn out into the position shown in Fig. 1, or pushed in under the chair-frame into the position shown by dotted lines, same figure.

M is a cord attached to rest-frame, and passed through the hole *f* in front chair-rail L. This cord M has a tassel or button, *g*, and by it the rest-frame can be drawn out from under the chair-frame when desired to use the rest. When the rest-frame D is out the rest E is revolved upon its pivot *b*, until it comes in contact with the brace G, as already described. By this movement it is brought forward or advanced in position on and relatively to its carrying-frame, and in such advanced position by its then rest on the brace G, together with its pivoted connection to its carrying-frame, it is firmly and rigidly held and supported, and, to all practical intents and purposes, as much so as if it were rigidly attached to its carrying-frame, and were not adapted for a movement such as described.

By moving the rest E in the reverse direction to that just above described, whereby it is brought to a rest on the brace $G^2$ of its carrying-frame, it is laid away and folded, as it were, compactly between the side rails of its carrying-frame, and the whole then in position to be pushed beneath the chair-seat, and then be within the compass of the leg-frame, making the support for the chair-seat.

The movements of the rest E on its carrying-frame, hereinabove-described, are of themselves, and they are independent of the movement of its carrying-frame, except, of course, that, for said movement of the rest E, its carrying-frame must be first drawn out from under the chair-seat, and in consequence of said movement the rest is given an increased projection at the front of the chair-seat beyond that which, owing to the necessary limit in depth of the chair from front to rear, the carrying-frame for the rest can possibly give the rest, consistent with a practical disposition of the whole of a foot-rest structure within the leg-frame of the chair, and thereby the rest is brought to the most advantageous position for the comfortable and easy support of the legs of the occupant, and, as has been hereinbefore described, in such position it is most firm and rigid—a result, in chair-foot rests of the class to which this invention relates, never before secured.

While the staple-pins *d* of the chair give the necessary and proper support and guidance to the herein-described movements of the rest carrying-frame in and out or from under the chair-seat, they practically leave the whole width of the chair-front open to the reception of the foot-rest E, and thus they allow the foot-rest E to be the better formed and upholstered for the best advantage, as a leg or foot-support to the occupant of the chair, all of which is plain to be seen, without further explanation, from an inspection of the drawings.

Having thus described my invention, what I claim, and desire to secure by Letters Patent, is—

1. The combination, with a chair-seat, of the frame D, which is supported and arranged to slide under the seat, and to which is pivoted directly the leg-rest E, in the manner set forth, whereby said leg-rest is adapted, by an independent movement, to be folded in and out of said carrying-frame, and when opened or folded out to be rigidly and firmly supported and at rest, for the purpose specified.

2. A chair, having a sliding frame arranged beneath its seat, to which is pivoted a leg-rest, upholstered on one side, and adapted to be revolved upon its pivots to bring the cushioned surface upward, and into a rigid position approximating the plane of the chair-seat.

3. A chair having a sliding frame arranged beneath its seat, a leg-rest cushioned upon one surface, pivoted directly to said frame and adapted to be revolved upon its pivots to bring the cushioned surface upward, and to advance the said leg-rest upon its frame, or to retract it to about the central part thereof, and bring the upholstered face underneath, preparatory to sliding the whole beneath the seat.

4. The rest-frame D, suspended beneath the chair, by links attached to the chair-frame, in combination with the foot-rest E, pivoted between the side rails of the rest-frame, and adapted to be folded and unfolded between them, as and for the object specified.

5. The frame D, composed of the side rails F F, rounds G $G^2$, and reversible foot-rest E, in combination with the suspended levers I I, and cross-rod *a*.

6. In combination with the front rail of the chair, the staples *d*, depending therefrom, substantially as described, whereby a support for the sliding foot-rest frame is formed, as set forth.

In testimony whereof I have hereunto signed my name before two subscribing witnesses.

J. H. TRAVIS.

Witnesses:
EDWIN W. BROWN,
GEO. H. EARL.